Aug. 26, 1924.
J. G. CALVERT ET AL
1,505,945
BUTTER CUTTER
Filed April 20, 1920
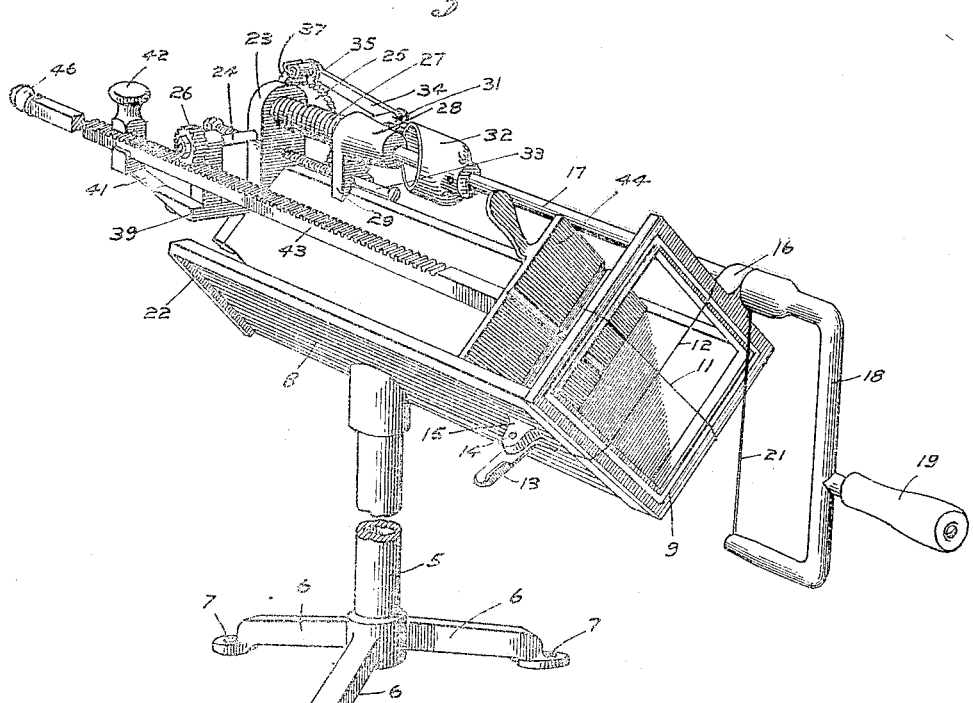
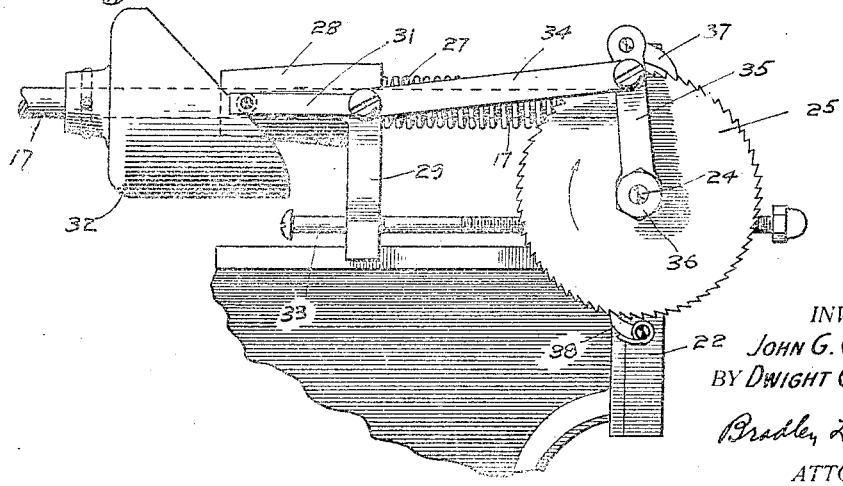
INVENTORS
JOHN G. CALVERT
BY DWIGHT C. CLINTON
Bradley L. Benson
ATTORNEY Patented Aug. 26, 1924.

1,505,945

UNITED STATES PATENT OFFICE.

JOHN G. CALVERT AND DWIGHT C. CLINTON, OF OAKLAND, CALIFORNIA.

BUTTER CUTTER.

Application filed April 20, 1920. Serial No. 375,313.

*To all whom it may concern:*

Be it known that we, JOHN G. CALVERT and DWIGHT C. CLINTON, citizens of the United States of America, residing at Oakland, in the county of Alameda and State of California, have invented certain new and useful Improvements in Butter Cutters, of which the following is a specification.

This invention relates to a new, novel and useful improvement in butter cutters.

The principal object of this invention is to produce a machine which will cut a standard pound cake of butter into four sections with respect to its longitudinal length and at the same time will cut the butter crosswise with respect to its thickness.

Another object of this invention is to produce a butter cutter which is simple in operation, cheap to manufacture and readily portable so that same may be transferred to different parts of an establishment as necessity demands.

Another object of this invention is accuracy—no slipping of parts. Positive drive. Another object is to produce a device which is sanitary and which can be easily cleaned.

Another object is to produce a cutter wherein the thickness of the cut may be regulated in accordance with the fluctuations of the price of butter as sold upon the market.

Other objects and advantages will be seen as the description proceeds.

In this specification and the annexed drawings, the invention is illustrated in the form considered to be the best, but it is to be understood that the invention is not limited to such form, because it may be embodied in other forms and it is also to be understood that in and by the claims following the description it is desired to cover the invention in whatever form it may be embodied.

In the drawings:

Figure 1 is a perspective view of the improved butter cutter.

Figure 2 is a fragmentary detailed view of the actuating mechanism.

Referring to the drawings in detail like numerals correspond to the similar members of the several views.

Numeral 5 designates a stand preferably made of metal for sanitary reasons. This stand is provided with a plurality of legs 6 which may be screwed to any convenient support such as a table by passing bolts through suitable openings 7 provided in the feet 6.

The numeral 8 designates an angular shaped member carried upon the tubular stand 5. This angular shaped member is provided at its forward end with a frame 9 suitably secured thereto and provided with cross wires 11 and 12. These wires are secured at one end and have their free end attached to a lever 13 pivoted at 14 to a lug 15 formed integral with the angular members 8. The frame 9 carries a lug 16 which is adapted to support one end of a shaft 17 extending parallel with one side of the angular member 8. This shaft is provided with a U-shaped member 18 having a handle 19 formed thereon. A wire 21 is stretched between the ends of the U-shaped member and in a position to contact with the wires 11 and 12 when the handle 19 is revolved about its pivoted point in the lugs 16. A suitable casting 22 is attached to the opposite end of the angular member 8 and carries an up-standing lug 23 which supports the free end of the shaft 17. This lug 23 also forms a journal for the shaft 24 carrying a rachet wheel 25 at one end and a rack gear 26 at its inner end. A spring 27 is mounted upon the shaft 17 so as to abut the lug 23 and a movable slide 28. This movable slide has an extension 29 which contacts with one edge of the angular shaped member 8 which forms a guide therefor. An offset portion 31 is formed upon the slide 28, and is adapted to be contacted by a cam 32 pinned to the shaft 17.

The numeral 33 designates a screw member extending through the extension 29 and passing through the lug 23. By rotating this screw 33 any amount of movement of the slide 28 may be regulated. Pivoted to an extension 31 is a link 34 best shown in Figure 2. This link is attached to a link 35 freely pivoted upon the end of the shaft 24 and held thereon by a nut 36. A spring pressed dog 37 is mounted upon the end of the link 35 and contacts with a ratchet 25. A spring pressed dog 38 is carried upon the casting 22 and serves to prevent backward movement of the ratchet wheel 25. The casting 22 also has a lug 39 formed integral therewith to which is attached in any convenient manner a spring 41 carrying a guide 42 at its outer end.

The numeral 43 refers to a rack bar attached to a pusher plate 44 carred at its forward end and is formed with handle 46 at its rear end.

By the construction thus described it is possible to place a block of butter within the angular member 8, and when the handle 19 is rotated the cam 32 will contact with the portion 31 and through the action of the spring 27 the slide 28 will be caused to move backwardly and forwardly. This in turn will result in the dog 37 causing the ratchet wheel 25 to rotate in the direction of the arrow which movement in turn will be transmitted through the shaft 24 to the rack gear 26, movement of which will advance the pusher 44 through the rack 43. At each rotation of the handle 19 the wire 21 will pass through the portion of butter protruding from the frame 9 which will have been cut in 4 sections at the wires 11 and 12. When it is desired to pull the pusher 44 backward to insert a new block of butter the guide 42 is depressed which releases the rack 43 from the rack gear 26 at which time by pulling upon the handle 46 the pusher at any time can be readily moved rearwardly.

It will be noted that the guide 42 is provided with a side opening thereby allowing rack bar to be entirely removed, together with its pusher, for the purpose of cleaning. If it is desired to operate this machine left-handed the cam member 32 may be given a quarter turn on the shaft 17 thereby timing the cutter wire carried by U-shaped frame so that it will pass through the butter after same has been advanced through the crossed cutter wires.

We are aware of the fact that butter cutters have been in operation which operate substantially in the same manner of the one that we mention, but we are unaware of any cutter which may be actuated intermittently and which will push the butter a positive distance at each actuation and we believe this feature to be new.

Having described our invention what we claim as new, novel and useful and desire to secure by Letters Patent of the United States is as follows:

1. In a butter cutter, an angular shaped member, a frame carried at one end of said angular shaped member, cutting wires carried by said frame, a pusher mounted within said angular shaped member, a rack bar extended to rear of said pusher, a spring pressed guide adapted to support the rear of said rack, means for advancing said pusher intermittently.

2. In a butter cutter, an angular shaped member, cutting wires mounted at the forward end of said angular shaped member, a pusher, a rack attached to said pusher, a cutting wire adapted to be moved in contact with first mentioned cutting wires, a shaft mounted parallel to one edge of said angular shaped member, a slide mounted on said shaft, means for limiting movements of said slide, a spring, a cam mounted on said shaft and adapted to actuate said slide, a link carried by said slide, a dog mounted at the opposite end of said link, a ratchet wheel mounted beneath said dog and adapted to rotate thereby, and means for preventing backward movement of said ratchet wheel.

3. In a butter cutter, an angular shaped member, cutting wires mounted at the forward end of said angular shaped member, a pusher, a rack attached to said pusher, a cutting wire adapted to be moved in contact with the first mentioned cutting wires, a shaft mounted parallel to one edge of said angular shaped member, a slide mounted on said shaft, means for limiting the movement of said slide, a spring, a cam mounted on said shaft and adapted to actuate said slide, a link carried by said slide, a dog mounted at the opposite end of said link, a ratchet wheel mounted beneath said dog and adapted to be rotated thereby, means for preventing backward movement of said ratchet wheel, a shaft, said ratchet wheel keyed to said shaft, and a rack gear attached to the opposite end of said shaft, said rack gear being capable of imparting positive movement to said rack.

In testimony whereof we affix our signatures.

JOHN G. CALVERT.
DWIGHT C. CLINTON.